(12) United States Patent
Northway et al.

(10) Patent No.: US 7,142,195 B2
(45) Date of Patent: Nov. 28, 2006

(54) INTERFACE FOR INTERACTION WITH DISPLAY VISIBLE FROM BOTH SIDES

(75) Inventors: David Northway, San Carlos, CA (US); John Cardozo, Woodside, CA (US)

(73) Assignee: Palm, Inc., Sunnyvale, CA (US)

( * ) Notice: Subject to any disclaimer, the term of this patent is extended or adjusted under 35 U.S.C. 154(b) by 98 days.

(21) Appl. No.: 09/874,473

(22) Filed: Jun. 4, 2001

(65) Prior Publication Data

US 2002/0180767 A1 Dec. 5, 2002

(51) Int. Cl.
*G09G 5/00* (2006.01)
(52) U.S. Cl. ............... 345/169; 345/901; 345/905; 361/681
(58) Field of Classification Search ........... 345/905, 345/156, 169, 102, 121, 901; 361/681
See application file for complete search history.

(56) References Cited

U.S. PATENT DOCUMENTS

| | | | | |
|---|---|---|---|---|
| 5,534,888 A | * | 7/1996 | Lebby et al. | 345/672 |
| 5,673,170 A | * | 9/1997 | Register | 361/681 |
| 5,761,485 A | * | 6/1998 | Munyan | 715/839 |
| 5,856,819 A | * | 1/1999 | Vossler | 345/102 |
| 5,896,575 A | * | 4/1999 | Higginbotham | 455/566 |
| 6,275,376 B1 | * | 8/2001 | Moon | 361/683 |
| 6,330,149 B1 | * | 12/2001 | Burrell | 361/683 |
| 6,466,292 B1 | * | 10/2002 | Kim | 349/143 |
| 6,525,706 B1 | * | 2/2003 | Rehkemper et al. | 345/87 |
| 6,593,908 B1 | * | 7/2003 | Borgstrom et al. | 345/156 |

FOREIGN PATENT DOCUMENTS

| | | |
|---|---|---|
| DE | 20018592 | 5/2001 |
| WO | 00/65822 | 11/2000 |

* cited by examiner

*Primary Examiner*—Richard Hjerpe
*Assistant Examiner*—Kimnhung Nguyen

(57) ABSTRACT

A portable viewing and computing apparatus. In one embodiment, the present invention is comprised of a bus, a memory unit coupled to the bus, and a processor coupled to the bus. The memory unit is for storing data and instructions. The processor is for processing data and instructions. The portable viewing and computing apparatus is further comprised of a display device coupled to the bus. The display device is comprised of a viewing panel viewable from a front side and a back side. The portable viewing and computing apparatus is further comprised of a display device controller coupled to the bus. The display device controller is for sensing the orientation and rotation of the display device, and in response thereto, for controlling and rendering data on the display device.

26 Claims, 12 Drawing Sheets

INTERFACE FOR INTERACTION WITH DISPLAY VISIBLE FROM BOTH SIDES

FIELD OF THE INVENTION

The present invention relates to portable computer systems. More particularly, the present invention provides a portable viewing and computing apparatus which is configured with a transparent display that is enabled to provide a viewable display whether viewed from a front side orientation or a rear side orientation.

BACKGROUND OF THE INVENTION

As the continuing advances in technology have enabled the further miniaturization of the components required to build computer systems, new categories of computer systems have been created. One of the newer categories of computer systems developed has been the portable, hand held, or "palmtop" computer system, referred to as a personal digital assistant or PDA. Other examples of a palmtop computer system include electronic address books, electronic day planners, electronic schedulers and the like.

A palmtop computer system is a computer that is small enough to be held in the user's hand and as such is "palm-sized." As a result, palmtops are readily carried about in the user's briefcase, purse, and in some instances, in the user's pocket. By virtue of its size, the palmtop computer, being inherently lightweight, is therefore exceptionally portable and convenient.

Because of the continuing miniaturization of computer systems and their related components, users of today's portable computers can now carry, in their briefcase, purse, or even their pocket, very powerful computers.

One drawback to the diminutive size of the portable computer system is that the display is also diminutive. Accordingly, the amount of data that can be displayed at one time is substantially less that that of a desktop monitor. Additionally, because the size of the display is smaller, the size of the text and/or graphics are commensurately reduced so as provide as much viewable data as possible given the reduced display area of the portable computer system. While this smaller sized display provides an adequate viewing for many applications, some require large displays.

Another drawback to the diminutive display panel is the quality of the display. To compensate for the diminutive size of the display, the resolution has been proportionally reduced. Another drawback to the diminutive display panel is that only a portion of a page of data may be displayed at one time. If someone is viewing a document that has numerous pages or is attempting to view a large amount of data, the viewer must flip from one screen display to another. In one attempt to provide for viewing a large document that contains multiple pages, a somewhat small scroll icon, displayed on the viewing screen, is provided. To utilize the scroll icon, a stylus, usually included with a portable computer, is used to touch the scroll icon, which results in advancing to the next screen display or reverting to the previous screen. Because of the small display screen, the scroll icon occupies some of the display screen, which can, in some circumstances, reduce the amount of data that can be displayed. While this attempt does provide a way to view data in a multiple format that is perfectly acceptable to many, others may deem the process somewhat inadequate for some of their particular needs, perhaps desiring a more natural way to scroll without having to utilize a somewhat small scroll icon and a stylus.

In another attempt to provide viewing of data in a multiple page format, one of the function buttons disposed upon the front surface of the portable computer system is utilized. To advance to the next page, an up button is depressed. To revert back to the previous page, a down button is depressed. While this attempt provides a way to view data in a multiple page format that is acceptable to many, there may be some who desire a more natural way to advance to a next page of screen display information.

SUMMARY OF THE INVENTION

Thus, a need exists for an apparatus that provides viewing and computing functionality and which is readily portable. Another need exists for an apparatus that fills the above need and which provides a multi-sided display for viewing. Additionally, a need exists for an apparatus than fills the above needs and which provides for viewing of large amounts of data in a convenient, seamless and natural manner. A further need exists for an apparatus that fills the above needs and which provides communication enablement for interaction with other portable computer systems. These and other objects and advantages of the present invention will, no doubt, become obvious to those of ordinary skill in the art after having read the following detailed description of the preferred embodiments which are illustrated in the various drawing figures.

Accordingly, the present invention is drawn to an electronic apparatus that provides viewing and computing functionality and which is readily portable. The present invention further provides an apparatus that achieves the above and which provides a multi-sided display for viewing. Furthermore, embodiments of the present invention also provide an apparatus that achieves the above and which also provides for viewing of large amounts of data in a convenient, seamless, and natural manner. Additionally, embodiments of the present invention further provides an apparatus that achieves the above and which also provide communication enablement for interaction with other portable computer systems.

More specifically, the present invention provides a portable viewing and computing apparatus having a display screen capable of displaying various pages of display information based on the orientation and movement of the device. In one embodiment, the present invention is comprised of a bus and a memory unit coupled to the bus. The memory unit is adapted to store data and instructions. In the present embodiment, the portable viewing and computing apparatus is further comprised of a processor coupled to the bus. The processor is adapted to process the data and instructions. The portable viewing and computing apparatus is further comprised of a display device coupled to the bus. The display device may be transparent in nature and is comprised of a viewing panel viewable from a front side and a back side. The present invention is further comprised of a display device controller coupled to the bus. The display device controller is adapted to sense the orientation and rotation of the display device. The display device controller is also adapted to control the display device and based thereon, alter the information displayed on one or both sides of the display screen. In the present embodiment, the portable viewing and computing apparatus is further comprised of a communication device coupled to said bus. The communication device is adapted to provide communication enablement to the portable viewing and computing apparatus.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
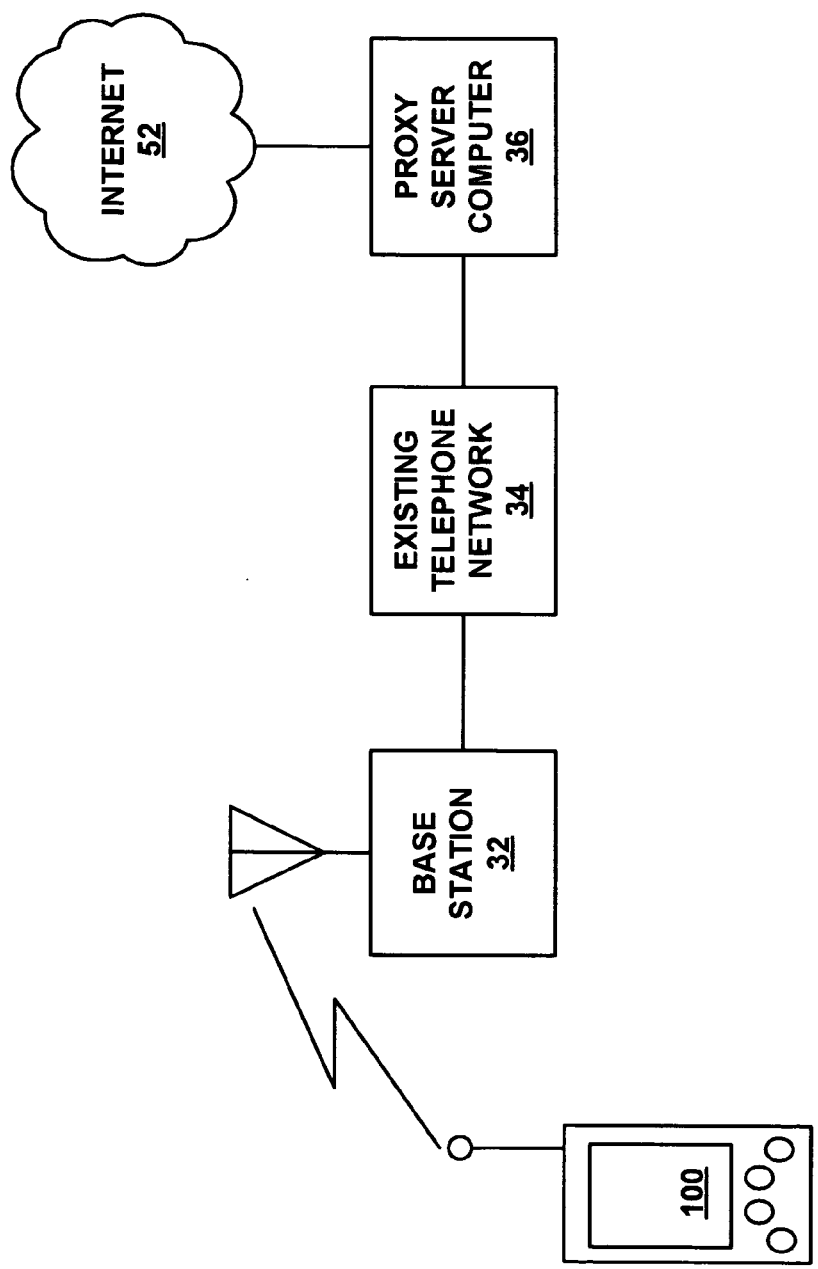
FIG. 1A is a block diagram of an exemplary network environment including a portable computer system in accordance with one embodiment of the present invention.

A portable viewing and computing apparatus is described. It should be appreciated that in one embodiment of the present invention, the portable viewing and computing apparatus may be a stand alone portable viewing and computing apparatus. In another embodiment, the portable viewing and computing system may be adapted to be electronically and removably coupled with a portable computer system, such that direct communication between portable viewing and computing apparatus and a portable computer system is established. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "rendering" or "rotating" or "displaying" or "sensing" or "storing" or "viewing" or "deriving" or "providing" or "optimizing" or "responding" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a portable viewing and computing apparatus, such as an "electronic book" or a viewing apparatus having computer system functionality, such as a palmtop or personal digital assistant. However, it is appreciated that the present invention can be used alone or with other types of devices that have the capability to access some type of central device or central site, including but not limited to palmtop computer systems.

Figure 1B:
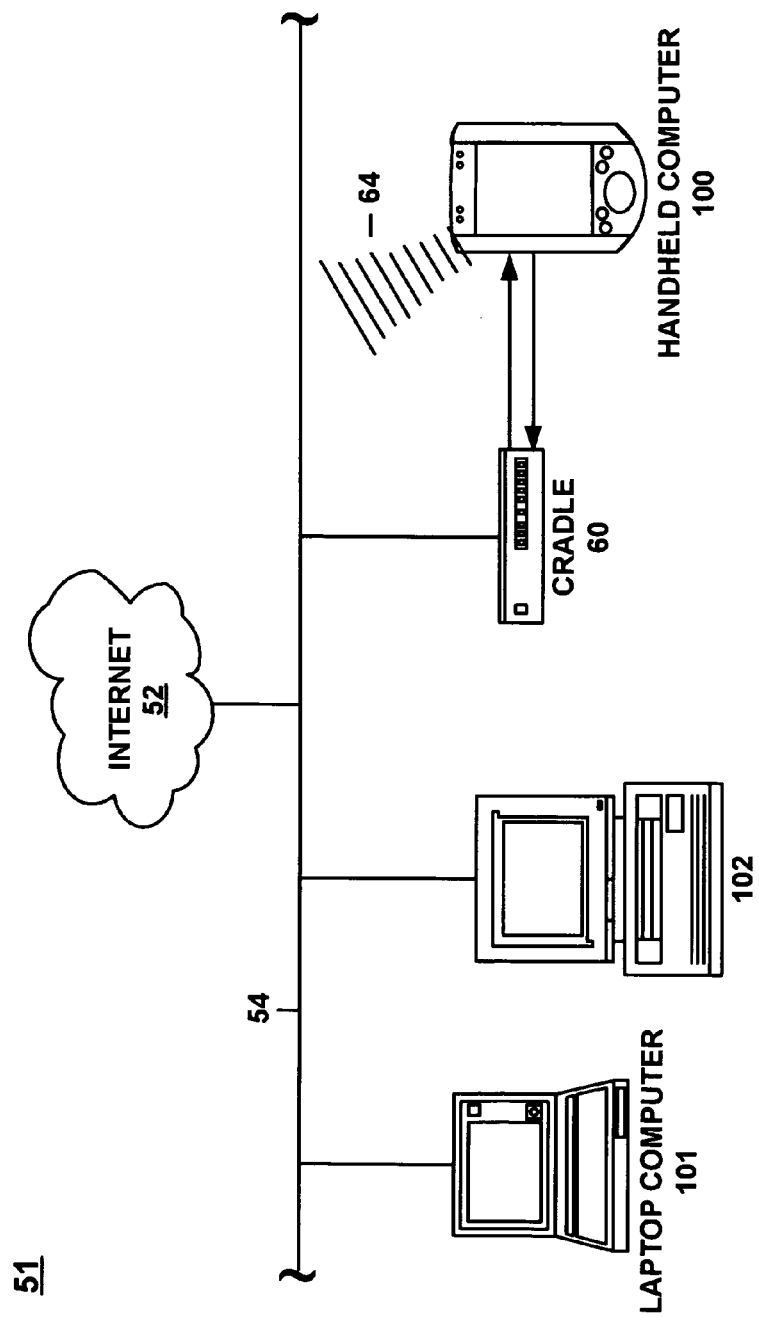
FIG. 1B is a block diagram of a portable computer system connected to other computer systems and the Internet in accordance with one embodiment of the present invention.
Figure 8A:
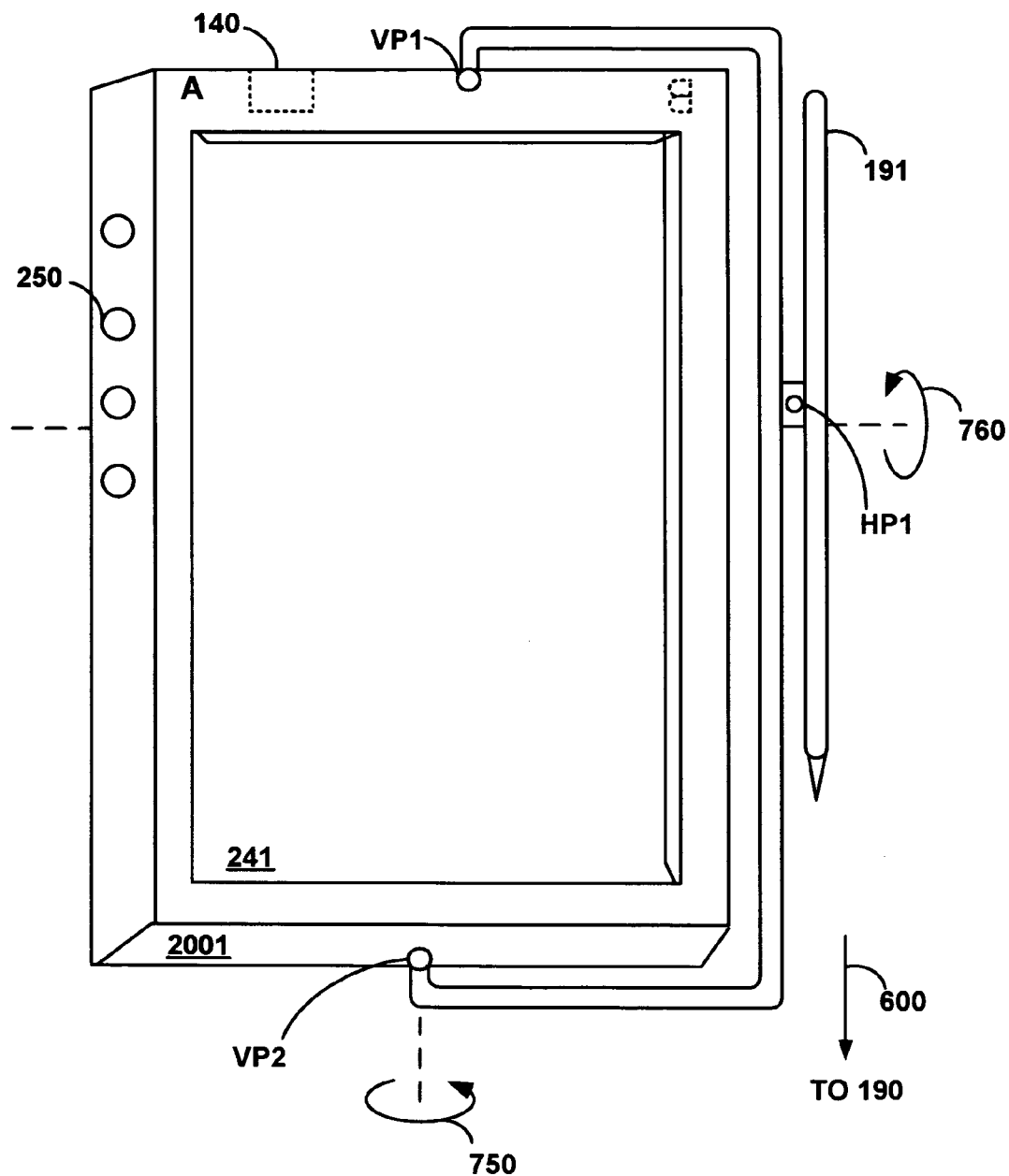
FIG. 8A is an illustrated front angled perspective view of the front side of a portable viewing and computing apparatus that is configured to rotate about the vertical axis and is adapted to be removably coupled with a portable computer system, in accordance with one embodiment of the present invention.
Figure 8B:
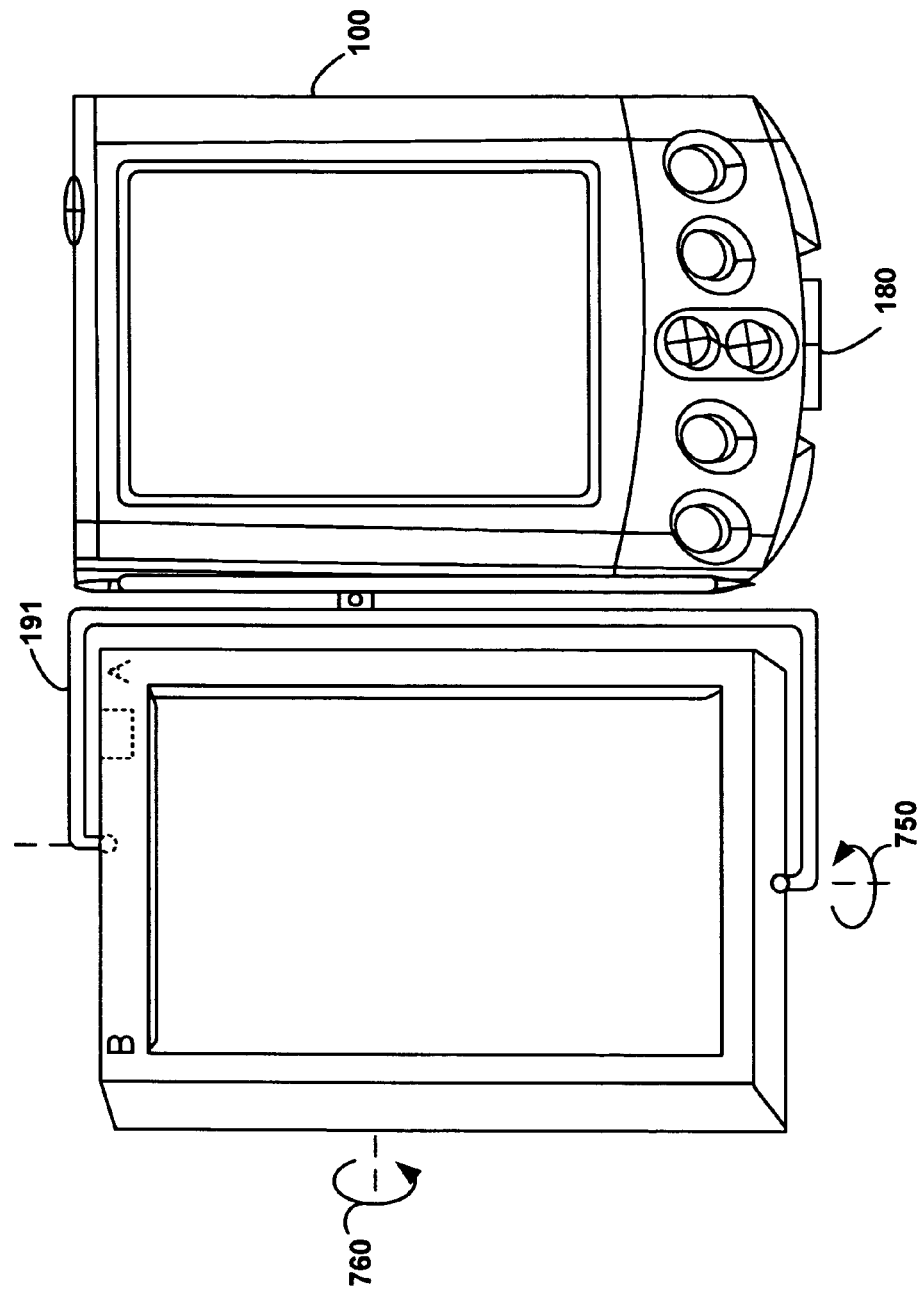
FIG. 8B is the portable viewing and computing apparatus of FIG. 8A shown as coupled to a portable computer system.

It should be appreciated that in one embodiment, the present invention may be configured to be functionally analogous to a portable computer system 100 is FIGS. 1A and 1B. Accordingly, the description of FIGS. 1A and 1B is therefore also applicable to the present invention, in one embodiment. It should be appreciated that in another embodiment, a palmtop computer system 100 (shown in FIGS. 2, 3A, and 3B) may be communicatively coupled to the present invention, PVACA (portable viewing and computing apparatus) 2001, as is shown in FIGS. 8A and 8B.

Exemplary Network Platform

FIG. 1A is a block diagram of an exemplary network environment 50 including a portable computer system 100 with which the present invention may interact, in accordance with one embodiment of the present invention. Portable computer system 100 is also known as a palmtop or palm-sized computer system. In one embodiment, portable computer system 100 has the ability to transmit and receive data and information over a wireless communication interface (e.g., a radio interface). For purposes of the present application, the term "portable computer system" is not intended to be limited solely to conventional palmtop or portable computers. Instead, the term "portable computer" or "portable computer system" is also intended to include any mobile electronic device. Such mobile devices include but are not limited to pagers and paging systems, wireless and cellular telephones, electronic address books, and numerous other mobile devices that may have the ability to wirelessly communicate with a network. As such, for purposes of the present application, the terms "portable computer" and "mobile device" will be considered synonymous and will be used interchangeably.

Base station 32 can be both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol) and CML (Compact Markup Language) and WML (Wireless Markup Language) can be used by portable computer-system 100 in the present embodiment.

It should be appreciated that one of the functions of proxy server 36 is to perform operations over the Internet 52 on behalf of portable computer system 100. For example, proxy server 36 has a particular Internet address and acts as a proxy device for portable computer system 100 over the Internet 52. It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. Additionally, in FIG. 1A, the existing telephone network could also be a packet-based network utilized by some conventional portable computer systems. However, a wireless communication interface is utilized to communicate data and information between portable computer system 100 and base station 32. Furthermore, nearly any wireless network can support the functionality to be disclosed herein.

FIG. 1B illustrates another embodiment of a system 51 that can be used in conjunction with various embodiments of the present invention. System 51 comprises a host computer system 56 that can either be a desktop unit 102 or alternatively, a laptop system 101. Optionally, one or more host computer systems can be used within system 51. Host computer systems 102 and 101 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 may also be coupled to a cradle 60 for receiving and initiating communication with portable computer system 100. Cradle 60 provides an electrical and mechanical communication interface between bus 54 (and anything coupled to bus 54) and the computer system 100 for two-way communications. Portable computer system 100 may instead be coupled to host computer systems 101 and 102 via a wireless (radio) connection. Computer system 100 also contains a wireless infrared communication mechanism 64 for sending and receiving information from other devices. Additionally, in FIG. 1B, the existing telephone network could also be a packet-based network utilized by some conventional portable computer systems.

With reference to both FIGS. 1A and 1B, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Exemplary Palmtop Platform

Figure 2:
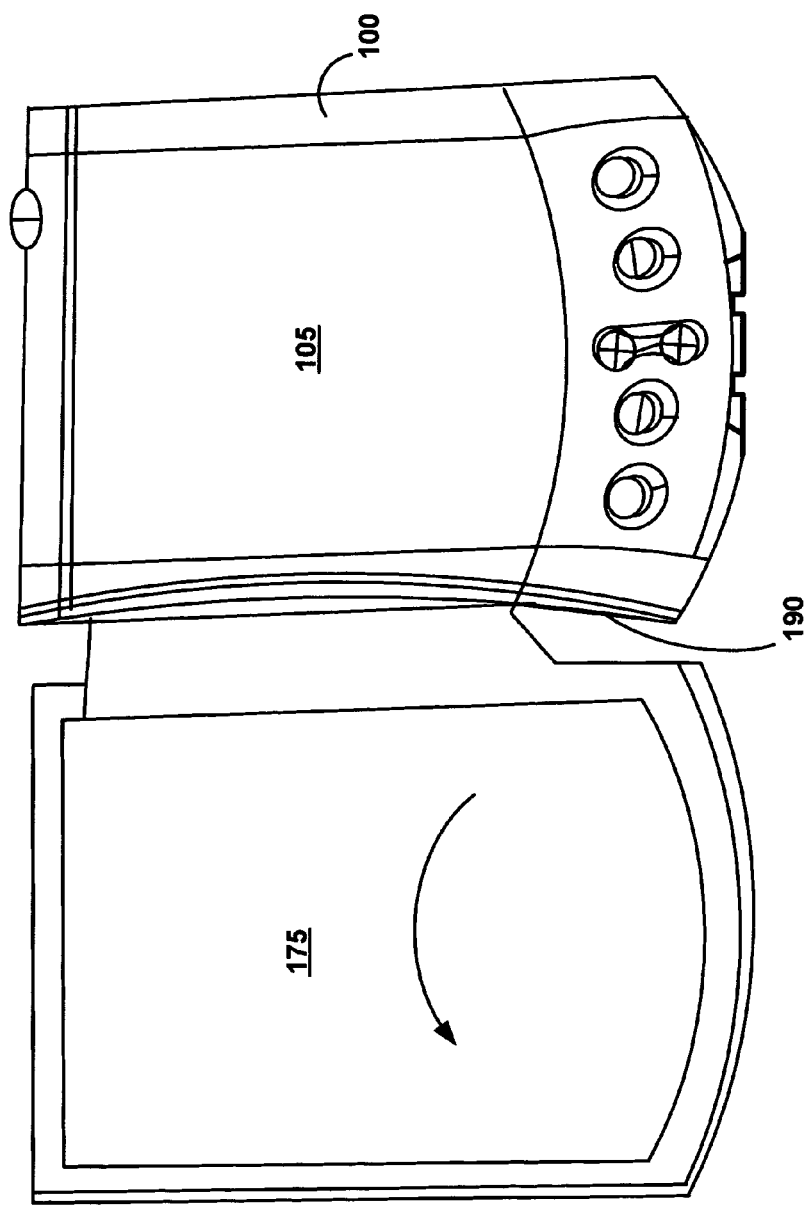
FIG. 2 is an illustrated front-angled view of a portable computer system configured with a removable front cover, upon which embodiments of the present invention may be practiced, in accordance with one embodiment of the present invention.

FIG. 2 is an illustrated front-angled perspective view of a portable computer system 100 shown as configured with a removable front cover 175. Removable front cover 175 is adapted to provide protection against damage to display screen 105. Removable front cover 175 may rotate as shown by the arrow, about the axis, or hinge. Removable front cover 175 is adapted to be removably inserted in receiving slot 190 (FIGS. 3A and 3B).

Figure 3:
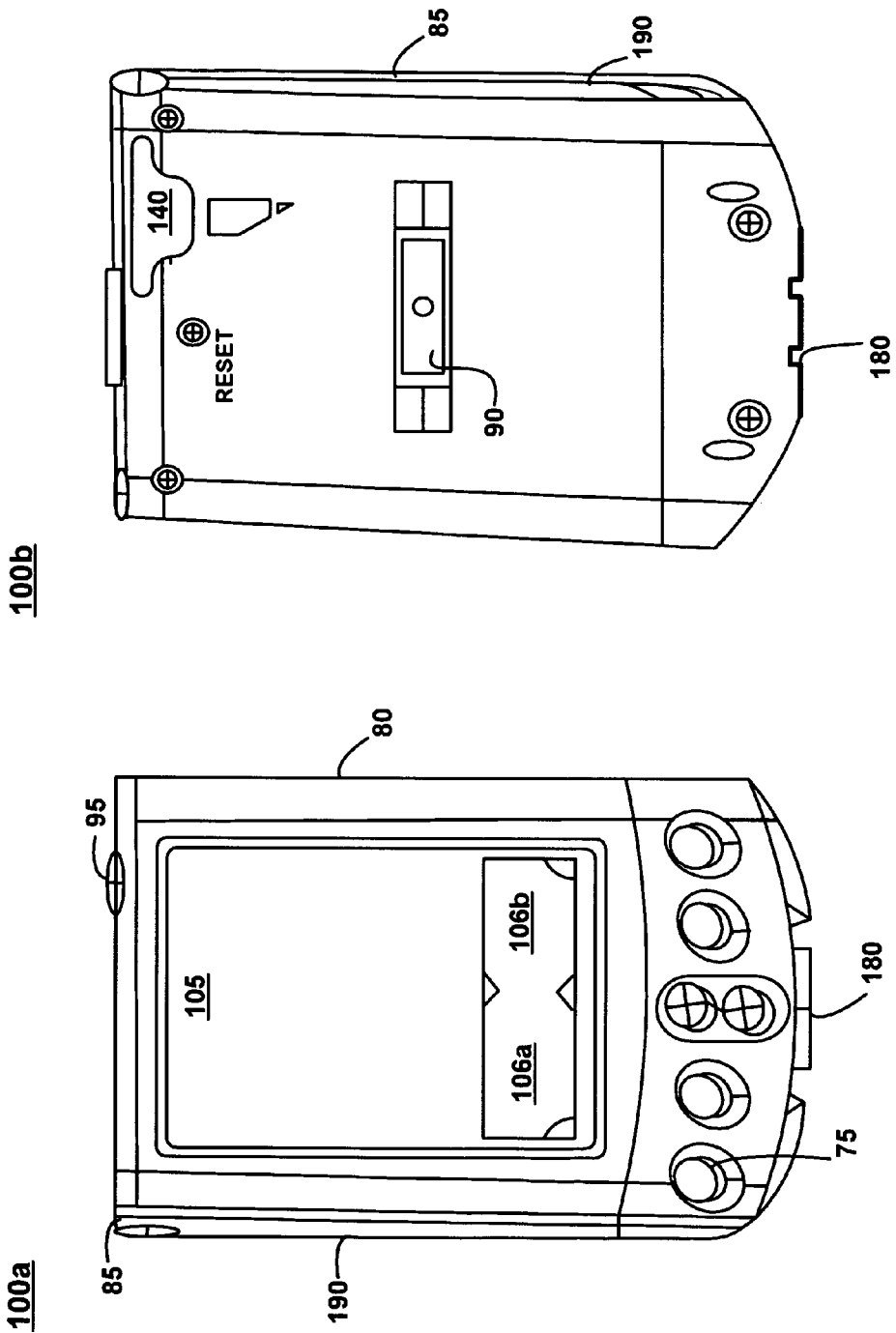
FIG. 3A is an illustrated front-angled view of a portable computer system shown without a front cover, upon which embodiments of the present invention may be implemented, in accordance with one embodiment of the present invention.
FIG. 3B is an illustrated rear-angled view of the portable computer system of FIG. 3A.

FIG. 3A is a front angled perspective view of the top face of a portable computer system 100, upon which embodiments of the present invention may be practiced. In FIG. 3A, removable front flip cover 175 is not shown to facilitate identification of receiving slot 190. Receiving slot 190 is configured with a hinge interface connector 189, as described in FIG. 4. Hinge interface connector 189 provides a communicative and electrical connection with a hinge interface connector 191, (shown in FIGS. 8A and 8B) when hinge interface connector 191 is inserted into receiving slot 190. Shown as disposed proximal to but separate from receiving slot 190 is extendible antenna 85.

Still referring to FIG. 3A, the top face 100a contains a flat panel display screen 105 surrounded by a bezel or cover. A removable stylus 80 is disposed along the right side edge of portable computer system, but by virtue of the angle of the illustration, is not visible. The display screen 105 is a touch screen able to register contact between the screen and the tip of stylus 80. Stylus 80 can be of nearly any material to make contact with screen 105. The top face 100a may also contain one or more dedicated and/or programmable buttons 75 for selecting information and causing the portable computer system to implement functions.

Still referring to FIG. 3A, also shown is communication interface connector 180. In one embodiment of the present invention, communication interface 180 is a serial communication port, but could also alternatively be of any of a number of well-know communication standards and protocols such as, e.g., parallel, SCSI (small computer system interface), Firewire (IEEE 1394) Ethernet, USB, or a bullet type communication interface.

FIG. 3B is a rear angled perspective view of the bottom side 100B of portable computer system 100 upon which embodiments of the present invention may be practiced. An extendible antenna 85 is shown, as is stylus 80, although due to the angle of the illustration, stylus 80 is not visible. Receiving slot 190, analogous to the receiving slot 190 of FIG. 3A is shown as disposed proximal to extendible antenna 85. Also shown is communication interface 180, analogous to communication interface 180 of FIG. 3A.

Still referring to FIG. 3B, also shown is optional data storage device receptacle 140, adapted to receive optional data storage devices such as, e.g., secure digital (SD) cards, multimedia cards (MMC), memory sticks, and the like. Because of the angle of the illustration, optional data storage device 140 is not visible in FIG. 3A.

Figure 4:
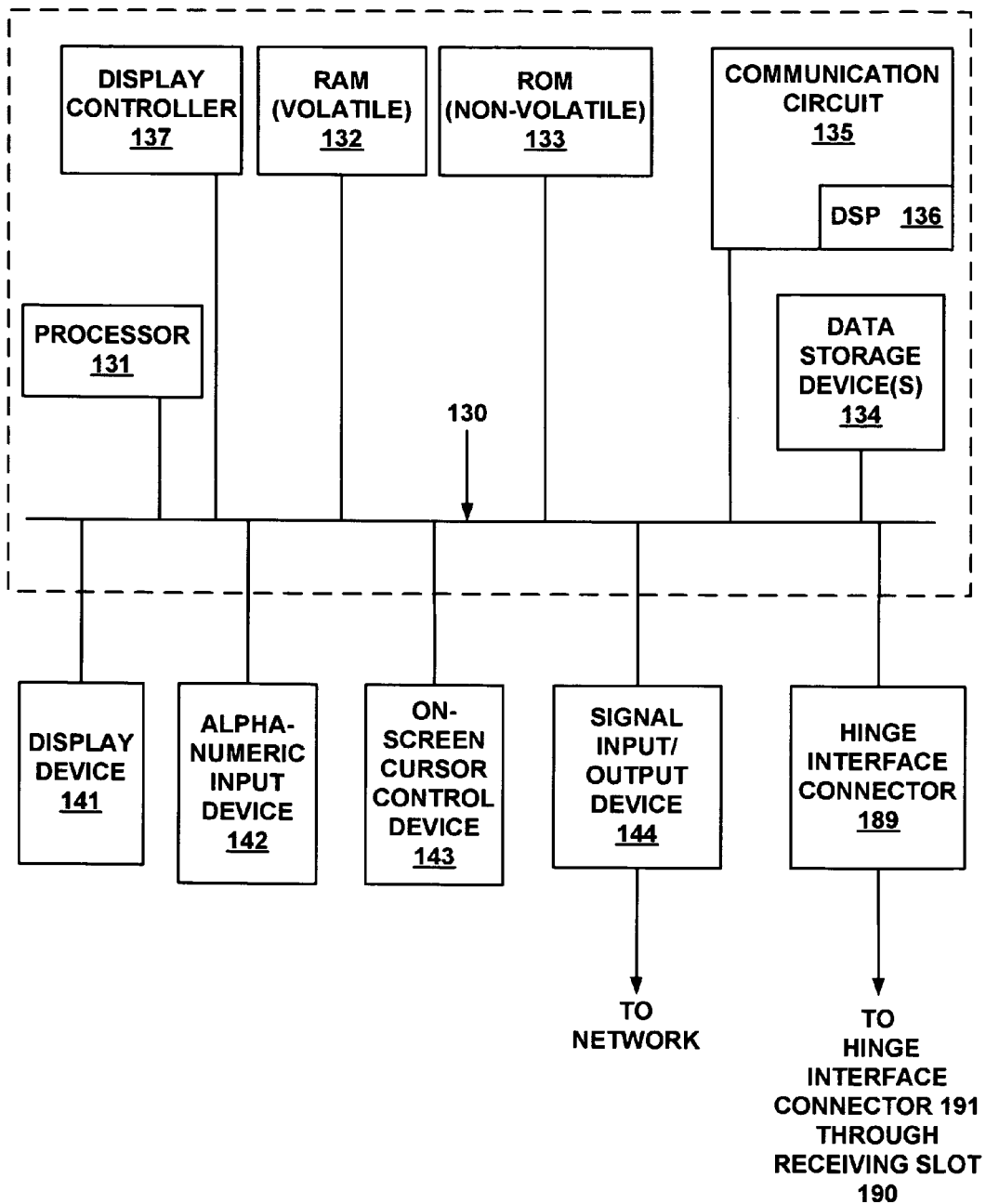
FIG. 4 is an illustrated block diagram of the circuitry and components disposed within a portable computer system, in accordance with one embodiment of the present invention.

FIG. 4 illustrates circuitry of portable computer system 100. Portable computer system 100 includes an address/data bus 130 for communicating information, a central processor 131 coupled with the bus for processing information and instructions, a volatile memory 132 (e.g., random access memory, RAM) coupled with the bus 130 for storing information and instructions for the central processor 131 and a non-volatile memory 133 (e.g., read only memory, ROM) coupled with the bus 130 for storing static information and instructions for the processor 131. Computer system 100 also includes an optional data storage device 134 (e.g., SD (secure digital) cards) coupled with the bus 130 for storing information and instructions. Device 134 can be removable. As described above, computer system 100 also contains a display device 141 coupled to the bus 130 for displaying information to the computer user.

With reference still to FIG. 4, computer system 100 also includes a signal transmitter/receiver device 144, which is coupled to bus 130 for providing a physical communication link between computer system 100, and a network environment (e.g., network environments 50 and 51 of FIGS. 1A and 1B, respectively). As such, signal transmitter/receiver device 144 enables central processor unit 131 to communicate wirelessly with other electronic systems coupled to the network. It should be appreciated that within the present embodiment, signal transmitter/receiver device 144 is coupled to antenna 85 (FIGS. 2, 3A, and 3B) and provides the functionality to transmit and receive information over a wireless communication interface. It should be further appreciated that the present embodiment of signal transmitter/receiver device 144 is well suited to be implemented in a wide variety of ways. For example, signal transmitter/receiver device 144 could be implemented as a modem. In another example, signal transmitter/receiver 144 may be enabled utilizing Bluetooth communication technology.

In one embodiment, computer system 100 includes a communication circuit 135 coupled to bus 130. Communication circuit 135 includes an optional digital signal processor (DSP) 136 for processing data to be transmitted or data that are received via signal transmitter/receiver device 144. Alternatively, processor 131 can perform some or all of the functions performed by DSP 136.

Also included in computer system 100 of FIG. 4 is an optional alphanumeric input device 142 that in one implementation is a handwriting recognition pad and buttons. Alphanumeric input device 142 can communicate information and command selections to processor 131. Computer system 100 also includes an optional cursor control or directing device (on-screen cursor control 143) coupled to bus 130 for communicating user input information and command selections to processor 131. In one implementation, on-screen cursor control device 143 is a touch screen device incorporated with display device 141. On-screen cursor control device 143 is capable of registering a position on display device 141 where the stylus makes contact. Display device 141 is suitable for generating graphic images and alphanumeric characters recognizable to the user. In the preferred embodiment, display device 141 is a flat panel display.

Still referring to FIG. 4, also shown is display controller 137. Display controller 137 is configured to control the orientation of display screen 141, thereby providing both portrait type (vertical) and landscape type (horizontal) viewing enablement to portable computer system 100. In one embodiment of the present invention, display controller 141 is an automatic sensing controller, such that, regardless of the orientation of the display screen 105 of FIG. 2 and FIG. 3A, the controller properly orients the data. In one example, when portable computer system is oriented in a portrait orientation, the data displayed is in the usual and customary vertical or portrait mode. When the computer system is oriented in a landscape orientation, the data displayed is reoriented to be readable, as in a vertical or landscape mode, but with the display horizontal.

In another embodiment of the present invention, display orientation controller 137 is a switch activated type controller. In the present embodiment, a dedicated and/or programmable button 75, (shown in FIG. 2), or a combination thereof, is/are configured to initiate reorientation of the display screen 105 of FIG. 2. In one example, a portable computer system 100, having viewable data, is rotated from a portrait (vertical) orientation to a landscape (horizontal) orientation. The viewable data appears in a sideways manner, analogous to a printed text page being held horizontally. A user may press programmable button(s) 75 which activates display orientation controller 137, and the viewable data is reoriented so as to be easily readable in a vertical manner, although the display screen is still in a horizontal mode. If the display screen is reoriented to a vertical mode, pressing programmable button(s) 75 again orients the viewable data to the original vertical mode.

Still referring to FIG. 4, also shown is hinge interface connector 189. Hinge interface connector 189 provides the electrical and communicative coupling of an apparatus coupled to the portable computer system 100 via receiving slot 190 (FIGS. 3A and 3B).

Utilization the Present Invention

Figures 5A, 5B:
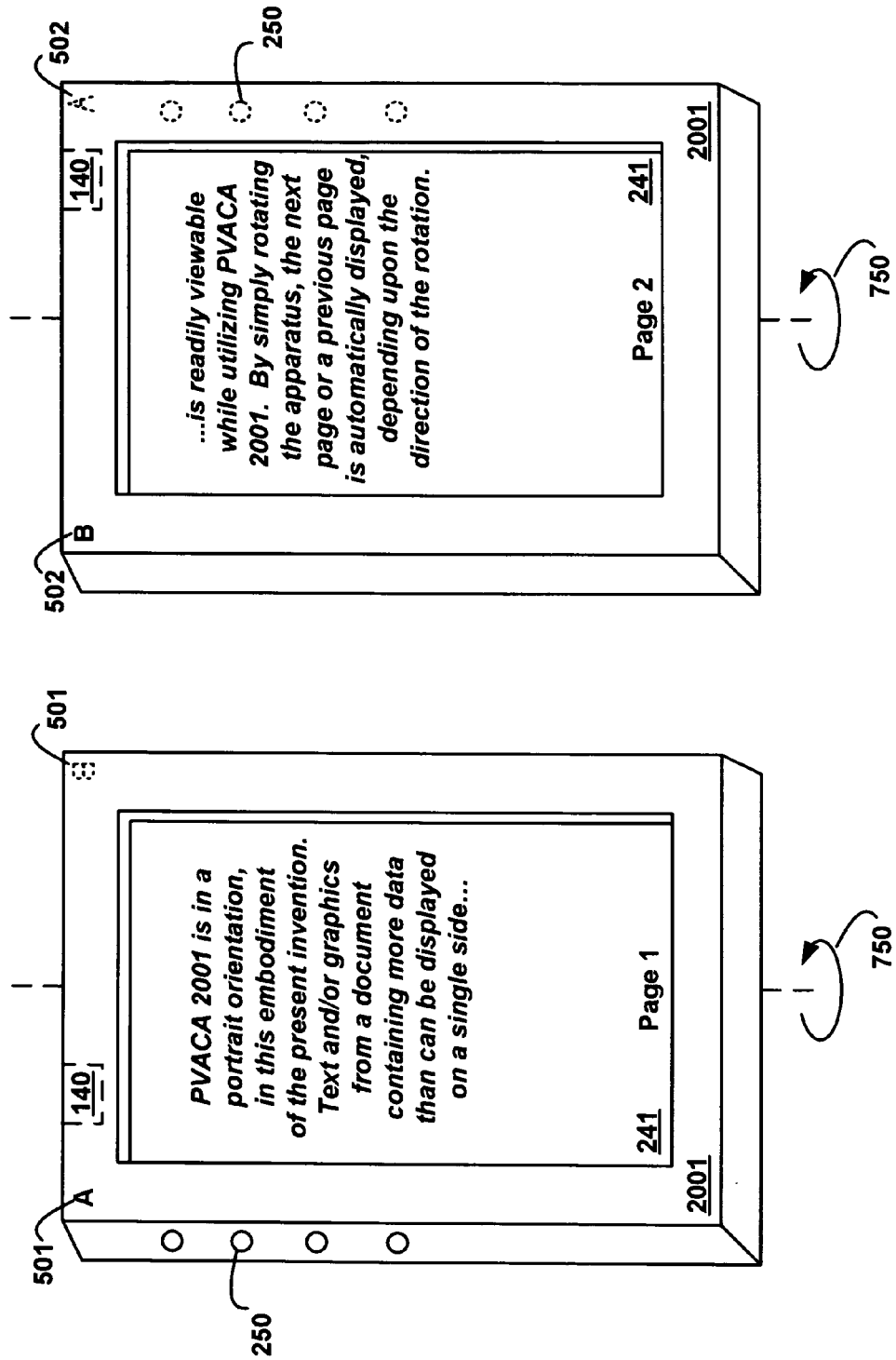
FIG. 5A is an illustrated angled view of the front side of a portable viewing and computing apparatus in a vertical/portrait orientation, in accordance with one embodiment of the present invention.
FIG. 5B is an illustrated angled view of the back side of the portable viewing and computing apparatus of FIG. 5A, shown as having been rotated about the vertical axis, in accordance with one embodiment of the present invention.

FIG. 5A is an illustrated front-angled view of a PVACA (portable viewing and computing apparatus) 2001 in a vertical/portrait orientation, in one embodiment of the present invention.

It should be appreciated that a solid letter A, front side indicator 501, shown in the upper left corner, indicates the side facing forward. A dashed letter B, back side indicator 502, shown on the upper right side, indicates the back side of display device 241 is facing away from the viewer. These letters are not part of the present invention, but are used for clarification as to which side of display panel 241 is being viewed during the description of the operation of PVACA 2001.

In one embodiment of the present invention, the technology utilized in the manufacturing of display device 241 is electronic paper. In another embodiment, the technology used is flat panel display technology. In another embodiment, the technology used may be flexible touch screen technology. In yet another embodiment, the technology used may be flexible fiber display technology. Further, in yet another embodiment, the technology utilized in the manufacturing of display device 241 is transparent display technology. It should be appreciated that nearly any display technology may be utilized in the manufacturing of display device 241 of the present invention, provided the technology used incorporates front side and back side display properties into the display device.

Still referring to FIG. 5A, optional data storage receptacle slot 140 is shown disposed toward the top left of PVACA 2001. Optional data storage receptacle slot 140 is adapted to receive optional data storage devices such as, e.g., secure digital (SD) cards, multimedia cards (MMC), memory sticks, and the like. Optional data storage receptacle slot 140 of FIG. 5A is analogous to the optional data storage receptacle 140 of FIG. 3B. Providing optional data storage receptacle 140 enables PVACA (portable viewing and computing apparatus) 2001 to readily access, display, and/or exchange the data contained within SD, MMC and memory stick cards, with other devices so configured.

Figures 5C, 5D:
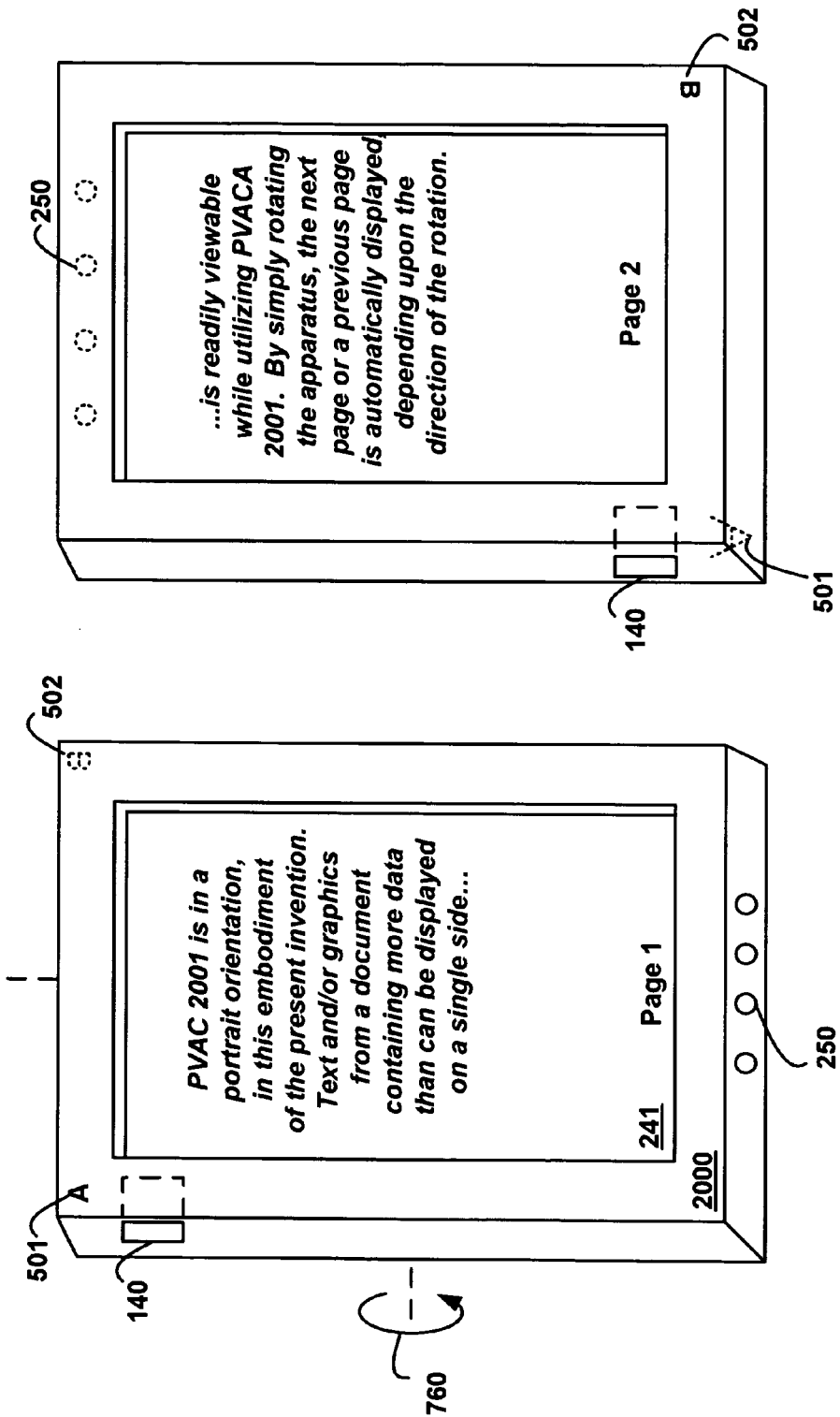
FIG. 5C is an illustrated angled view of the front side of the portable viewing and computing apparatus as shown in FIG. 5A.
FIG. 5D is an illustrated angled view of the portable viewing and computing apparatus of FIG. 5C, shown as having been rotated about the horizontal axis, in accordance with one embodiment of the present invention.

Still with reference to FIG. 5A, function buttons 250 are shown. Function buttons 250 may be dedicated or programmable. In the present embodiment, function control buttons 250 are shown as being disposed upon the left side edge surface of the present invention. In another embodiment, they may be disposed upon another surface of the present invention, as shown in FIGS. 5C and 5D. It should be appreciated that function control buttons 250 may be disposed nearly anywhere upon the present invention. It should be further appreciated that although FIG. 5A shows four function control buttons disposed thereon, fewer or more function control buttons may be disposed thereon, and that function control buttons 250 may be of a shape and size different from those depicted. It should also be appreciated that in another embodiment, function control buttons may not be present, their functionality replaced by an on-screen cursor control, or an alphanumeric input device.

Figure 6A:
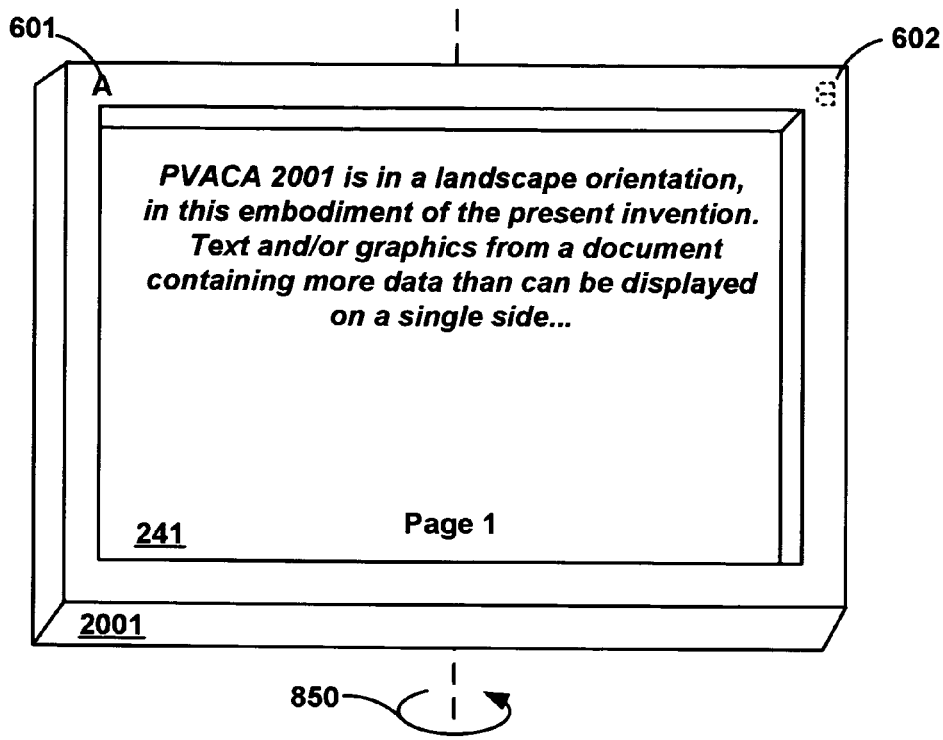
FIG. 6A is an illustrated angled view of the front side of a portable viewing and computing apparatus in a horizontal/landscape orientation, in accordance with one embodiment of the present invention.
Figure 6B:
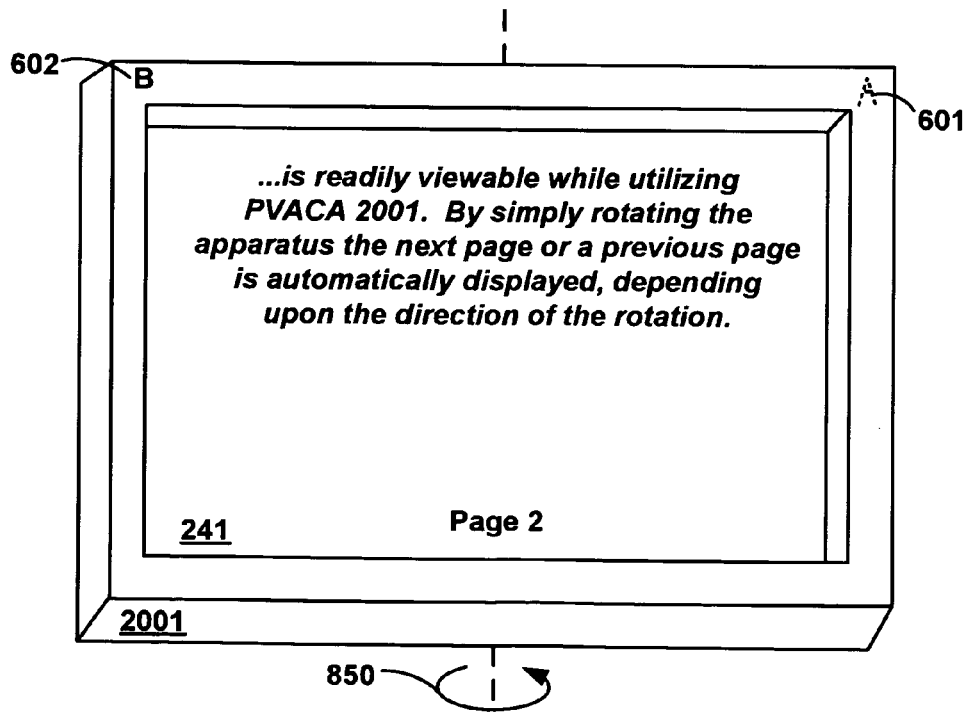
FIG. 6B is an illustrated angled view of the back side of the portable viewing and computing apparatus of FIG. 6A, shown as having been rotated about the vertical axis, in accordance with one embodiment of the present invention.
Figure 6C:
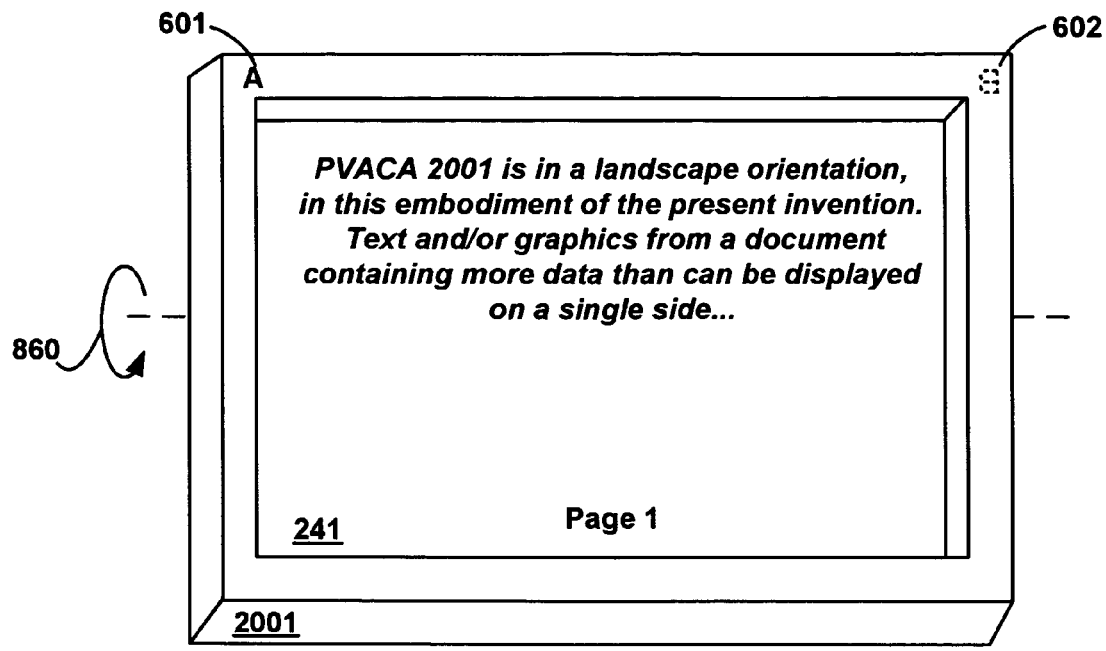
FIG. 6C is an illustrated angled view of the front side of the portable viewing and computing apparatus as shown in FIG. 6A.
Figure 6D:
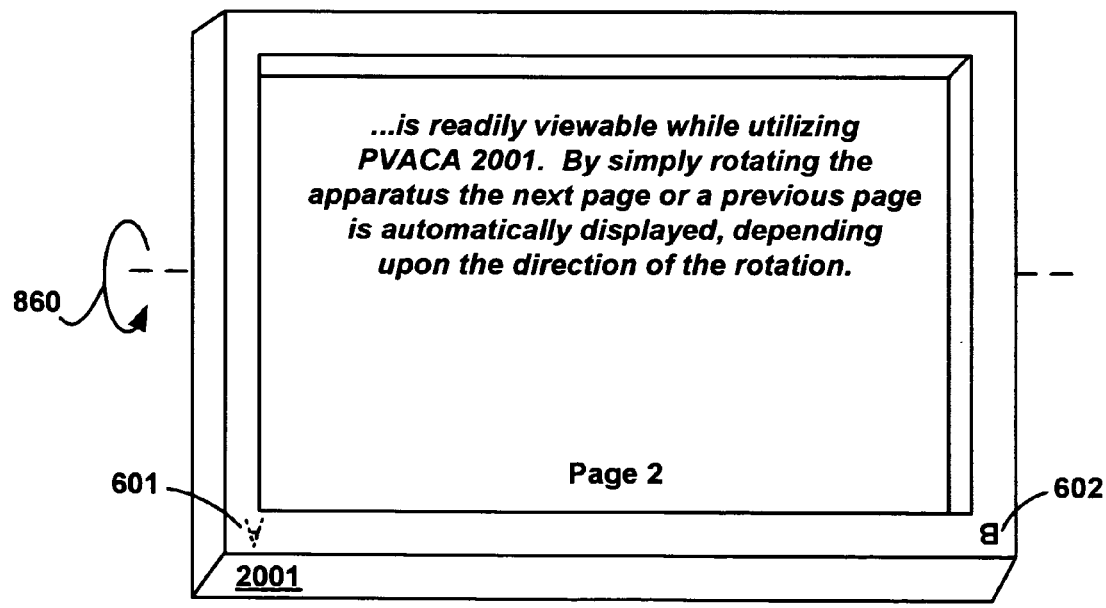
FIG. 6D is an illustrated angled view of the portable viewing and computing apparatus of FIG. 6C, shown as having been rotated about the horizontal axis, in accordance with one embodiment of the present invention.
Figure 7:
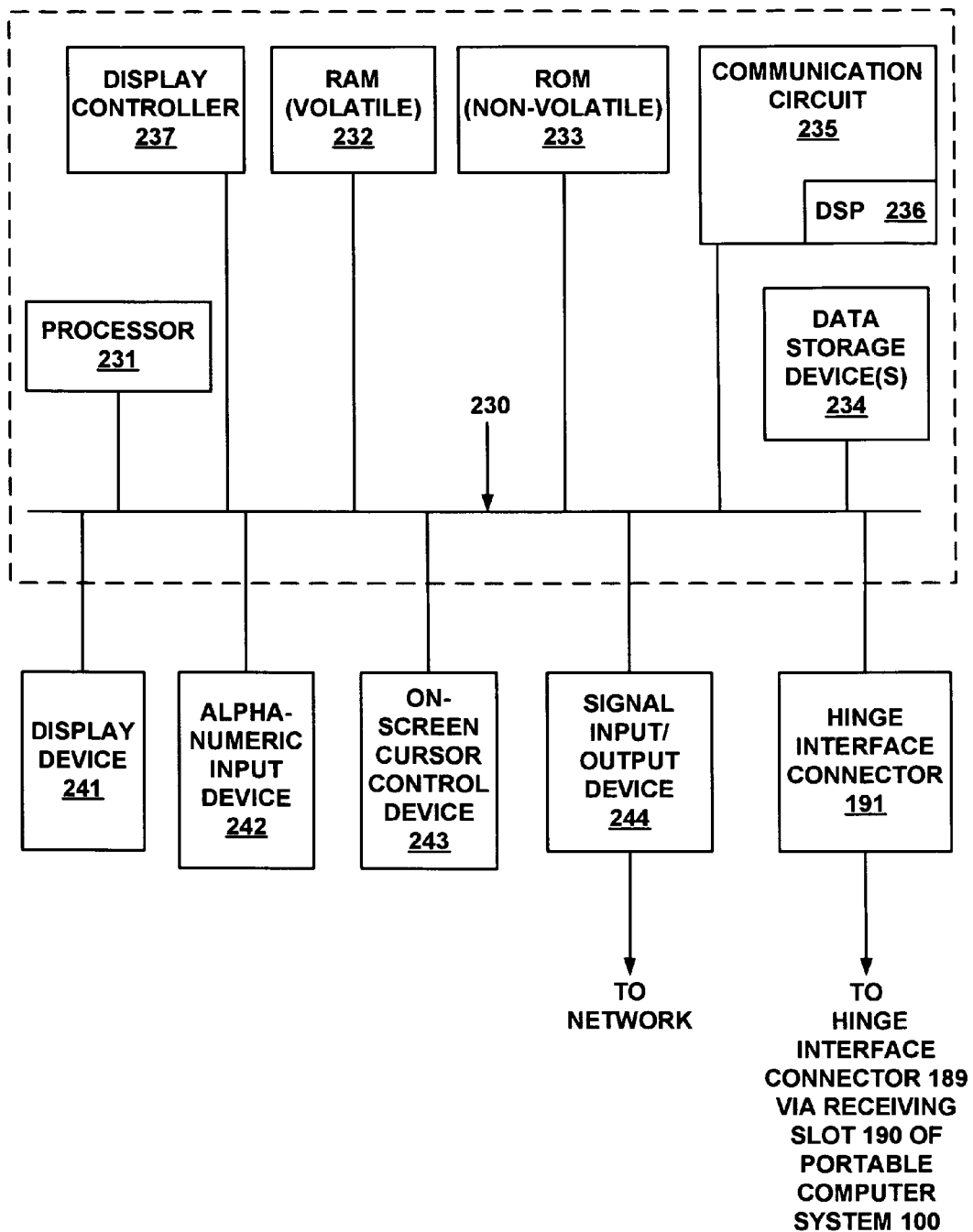
FIG. 7 is an illustrated block diagram of the circuitry and components disposed within a portable viewing and computing apparatus, in accordance with one embodiment of the present invention.

It should be distinctly pointed out that in the present embodiment, PVACA 2001 contains therein a display device controller 237, shown in FIG. 7 (not shown but present in FIGS. 5A–5D, 6A–6D, 8A, and 8B). Display device controller 237 senses the orientation and rotation of display device 241, and, responding thereto, controlling display device 241 to provide proper display orientation of viewable data.

In one embodiment, display device controller 237 is adapted to provide displays optimized for languages that are read from left to right, e.g., English, Russian, Italian, Swedish, and so on. In another embodiment, display device controller is adapted to provide displays optimized for languages that are read from right to left, e.g., Hebrew, Arabic, Farsi, and the like. In yet another embodiment, transparent display controller 237 could be adapted to provide displays optimized for languages the are column based, e.g., Japanese, and others. It should be appreciated that display device controller 237 is adaptable to provide proper orientation of text and graphics for nearly all societies and nearly all languages.

Still referring to FIG. 5A, in this embodiment of the present invention, PVACA (portable viewing and computing apparatus) 2001 is shown as rotatable about the vertical axis, as indicated by arrow 750. In the present embodiment, PVACA 2001 is shown as viewably displaying a page 1 of a document. In this example, the document contains data of a quantity greater than can be displayed on a single side of display device 241. When PVACA 2001 is being utilized to read documents or graphics having multiple pages, advancing to the next page, or returning to a previous page, it is no longer necessary to press a button or touch the screen. In this embodiment, while using PVACA (portable viewing and computing apparatus) 2001, to advance to the next page a user simply rotates PVACA 2001 about the vertical axis in a right-to-left motion, nearly analogous to the turning of a page in a book or magazine. This right-to-left rotation automatically advances forward (e.g., performs a scroll) and displays the text or graphics, page 2 in this example, on the back side, as indicated by back side indicator 502, of the PVACA 2001, as shown in FIG. 5B. To advance to a page 3, rotating PVACA 2001 in a right-to-left motion is repeated, and so on to the end of the document. To return to page 2, from a viewable page 3, a user would reverse rotate PVACA 2001, in a left-to-right motion. This rotation would automatically cause display device controller 237 to re-render page 2, and enable the display thereof. To return to page 1, the left-to-right rotation about the vertical axis would be repeated.

FIG. 5B shows PVACA (portable viewing and computing apparatus) 2001 of FIG. 5A as having been rotated about the vertical axis, such that page 2 of the exampled document is displayed. Solid letter B, back side indicator 502, shown in the upper left corner indicates that the back side is now facing forward. Dashed letter A, front side indicator 501, shown on the upper right side, indicates that the previous front side of display panel 241 is now facing away from the viewer.

Still referring to FIG. 5B, it should be appreciated that, because of the rotation of PVACA 2001 about the vertical axis, function control buttons 250 are now disposed upon the right side edge surface of PVACA 2001. Additionally, optional data storage receptacle 140 is now disposed more toward the right of PVACA 2001, in comparison to the location as shown in FIG. 5A.

FIG. 5C is another illustrated front-angled view of PVACA (portable viewing and computing apparatus) 2001 in a vertical/portrait orientation, in one embodiment of the present invention. Solid letter A, front side indicator 501, shown in the upper left corner, indicates the side facing forward. Dashed letter B, back side indicator 502, shown on the upper right side, indicates the back side of display device 241 is facing away from the viewer. These letters are not part of the present invention, but are used for clarification as to which side of display panel 241 is being viewed during the description of the operation of PVACA 2001.

In this embodiment, PVACA 2001 is shown to have function control buttons 250 disposed upon the bottom edge. Also, optional data storage device receptacle 140 is shown to be disposed upon the upper left edge surface of PVACA (portable viewing and computing apparatus) 2001. In this example, PVACA 2001 is shown to be rotatable about a horizontal axis, as indicated by arrow 760. In this example, viewable text from page 1 of a document is displayed. In this embodiment, to advance to page 2 PVACA 2001 is rotated in a top-to-bottom motion, thereby causing the automatic displaying page 2 of the document, as shown in FIG. 5D. To advance to page 3, the same top-to-bottom rotation is applied, and accordingly, to revert to the previous page, a bottom-to-top motion is applied.

FIG. 5D shows PVACA (portable viewing and computing apparatus) 2001 of FIG. 5C having been rotated about a horizontal axis. Inverted solid letter B, back side indicator 502, indicates that the back side of display panel 241 is now facing the viewer. Inverted dashed letter A, front side indicator 501, shown in the lower left corner, indicated the side facing away from the viewer.

Due to the rotation of PVACA 2001, optional data storage receptacle 140 is now oriented toward the bottom left side of PVACA 2001, and function control buttons 250 are oriented on the top edge of PVACA 2001.

It should be appreciated that in the embodiment depicted in FIGS. 5A and 5b, the rotation was only about the vertical axis, and in the embodiment depicted in FIGS. 5C and 5D, the rotation was only about the horizontal axis. However, in another embodiment of the present invention, the rotations can be combined. For example, for the languages read from left-to-right, to advance to page 2, a rotation of PVACA 2001 in a right-to-left motion can be used, and to advance to page 3, a rotation of PVACA 2001 in a top-to-bottom motion can be used. Alternatively, a rotation of PVACA 2001 in a top-to-bottom motion would advance to page 2 and to advance to page 3, a rotation of PVACA in a right-to-left motion could be used. Or any number of top-to-bottom rotations can be combined with any number of right-to-left rotations to advance through the document. Conversely, any number of left-to-right rotations or bottom-to-top rotations will cause the display to revert to the previous pages. For languages that are read from right-to-left, the rotations are reversed.

FIG. 6A is an illustrated front-angled view of a PVACA (portable viewing and computing apparatus) 2001 in a horizontal/landscape orientation, in one embodiment of the present invention. It should be appreciated that the PVACA 2001 to be shown in the following, FIGS. 6A–6D is analogous to the PVACA 2001 shown in FIGS. 5A–5D. Accordingly, function control buttons 250 and optional data storage device receptacle 140 as described in FIGS. 5A–5D are not shown nor described, so as not to duplicate the description thereof and to unnecessarily lengthen this disclosure.

Solid letter A, front side indicator 601, shown in the upper left corner, indicated the side facing forward. Dashed letter B, back side indicator 602, shown in the upper right, indicates that the back side of display panel 241 is facing away from the viewer.

Still referring to FIG. 6A, in this embodiment of the present invention, PVACA (portable viewing and computing apparatus) 2001 is shown to be rotatable about the vertical axis, as indicated by arrow 850. In the present embodiment, PVACA 2001 is shown to be viewably displaying a first page of a document too large to be displayable on a single side of PVACA 2001. As described in FIGS. 5A–5D, advancing to the next page no longer requires a pressing of a button or touching of the screen. In this example, while using PVACA (portable viewing and computing apparatus) 2001, to advance to the next page a user simply rotates PVACA 2001 about the vertical axis in a right-to-left motion, nearly analogous to the turning of a page in a book or magazine. This right-to-left rotation automatically advances forward (e.g., performs a scroll) and displays the text, page 2 in this example, on the other side, side B, of the PVACA 2001, as shown in FIG. 6B. To advance to a page 3, the process of rotating PVACA 2001 in a right-to-left motion is repeated, and so on to the end of the document. To return to page 2, from a viewable page 3, a user would rotate PVACA 2001 in a left-to-right motion, which would automatically redisplay page 2. To return to page 1, the left-to-right rotation about the vertical axis would be repeated, as described for returning to page 2 from page 3.

FIG. 6B shows PVACA (portable viewing and computing apparatus) 2001 of FIG. 6A as having been rotated about the vertical axis, and is shown to be visibly displaying page 2. Solid letter B, back side indicator 602, shown in the upper left corner, indicates the side facing forward. Dashed letter A, front side indicator 601, shown on the upper right side, indicates that the previous front side of display panel 241 is now facing away from the viewer.

FIG. 6C is another illustrated front-angled view of PVACA (portable viewing and computing apparatus) 2001 in a horizontal/landscape orientation, in one embodiment of the present invention. Solid letter A, front side indicator 601, shown in the upper left corner, indicated the side facing forward. Dashed letter B, back side indicator 602, shown in the upper right, indicates that the back side of display panel 241 is facing away from the viewer.

In this example, PVACA 2001 is shown to be rotatable about a horizontal axis, as indicated by arrow 860. In this example, viewable text from page 1 of a document is displayed. In this embodiment, to advance to page 2, PVACA 2001 is rotated in a top-to-bottom motion, thereby causing the automatic displaying of page 2 of the document, as shown in FIG. 6D. To advance to page 3, the same top-to-bottom rotation is applied, and accordingly, to revert to the previous page, a bottom-to-top motion is applied.

FIG. 6D shows PVACA (portable viewing and computing apparatus) 2001 of FIG. 6C having been rotated about a horizontal axis. Inverted solid letter B, back side indicator 602, indicates that the back side of display panel 241 is now facing the viewer. Inverted dashed letter A, front side indicator 601, shown in the lower left corner, indicated the side facing away from the viewer.

It should be appreciated that in the embodiment depicted in FIGS. 6A and 6B, the rotation was only about the vertical axis, and in the embodiment depicted in FIGS. 6C and 6D, the rotation was only about the horizontal axis. In another embodiment of the present invention, the rotations can be combined. For example, for the languages read from left-to-right, to advance to page 2, a rotation of PVACA 2001 in a right-to-left motion can be used. To advance to page 3, a rotation of PVACA 2001 in a top-to-bottom motion can be used. Alternatively, a rotation of PVACA 2001 in a top-to-bottom motion would advance to page 2 and to advance to page 3, a rotation of PVACA in a right-to-left motion could be used. Or any number of top-to-bottom rotations can be combined with any number of right-to-left rotations to advance through the document. Conversely, any number of left-to-right rotations or bottom-to-top rotations will cause the display to revert to the previous pages. For the languages that read from right-to-left, the rotations would be reversed.

FIG. 7 is a block diagram of the circuits and components that may be contained within PVACA (portable viewing and computing apparatus) 2001, in one embodiment of the present invention. PVACA 2001 includes an address/data bus 230 for communicating information, a central processor 231 coupled with the bus for processing information and instructions. PVACA further includes a volatile memory 232 (e.g., random access memory, RAM) coupled with the bus 230 for storing information and instructions for the central processor 231, and a non-volatile memory 233 (e.g., read only memory, ROM) coupled with the bus 230 for storing static information and instructions for the processor 231. PVACA 2001 also includes an optional data storage device 234 (e.g., SD (secure digital) cards) coupled with the bus 230 for storing information and instructions. Device 234 can be removable. As described above, PVACA 2001 also contains a display device 241 coupled to the bus 230 for displaying information to the computer user.

With reference still to FIG. 7, PVACA (portable viewing and computing apparatus) 2001 also includes a signal transceiver device 244, coupled to bus 230, for providing a physical communication link between PVACA 2001 and a network environment (e.g., network environments 50 and 51 of FIGS. 1A and 1B, respectively). As such, signal transceiver device 244 enables central processor unit 231 to communicate wirelessly with other electronic systems coupled to the network. It should be appreciated that within the present embodiment, signal transmitter/receiver device 244 provides the functionality to transmit and receive information over a wireless communication interface. It should be further appreciated that the present embodiment of signal transmitter/receiver device 244 is well suited to be implemented in a wide variety of ways. For example, signal transmitter/receiver device 244 could be implemented as a wireless or wired modem. In another embodiment, signal transmitter/receiver 244 may be enabled utilizing Bluetooth communication technology.

In one embodiment, PVACA (portable viewing and computing apparatus) 2001 includes a communication circuit 235 coupled to bus 230. Communication circuit 235 includes an optional digital signal processor (DSP) 236 for processing data to be transmitted or data that are received via signal transmitter/receiver device 244. Alternatively, processor 231 can perform some or all of the functions performed by DSP 236.

Also included in PVACA 2001 of FIG. 7 is an optional alphanumeric input device 242 that in one implementation is a handwriting recognition pad and buttons. Alphanumeric input device 242 can communicate information and command selections to processor 231. PVACA 2001 also includes an optional cursor control or directing device (on-screen cursor control 243) coupled to bus 230 for communicating user input information and command selections to processor 231. In one implementation, on-screen cursor control device 243 is a touch screen device incorporated with transparent display device 241. On-screen cursor control device 243 is capable of registering a position on transparent display device 241 where the stylus makes contact. Transparent display device 241 is suitable for generating graphic images and alphanumeric characters recognizable to the user. In one embodiment, transparent display device 241 is a transparent flat panel display.

Still referring to FIG. 7, also shown is transparent display controller 237. Transparent display controller 237 is adapted to sense the orientation and rotation of PVACA 2001, and in response thereto, control display device 241, so as to provide both vertical axis rotation and horizontal axis rotation viewing enablement to PVACA 2001. In one embodiment of the present invention, display device controller 237 is an automatic sensing controller, such that display device 241 provides the appropriate display of data to a user, regardless of the rotation applied to PVACA 2001

Still referring to FIG. 7, in one embodiment of the present invention, also shown is optional hinge interface connector 191. Optional hinge interface connector 191 provides the electrical and communicative coupling of PVACA 2001 to an apparatus configured with a hinge interface connector 189 via a receiving slot 190, which in one example, is portable computer system 100 of FIGS. 3A, 3B, 8A, and 8B.

FIG. 8A is an illustrated front-angled view of PVACA (portable viewing and computing apparatus) 2001, in one embodiment of the present invention. PVACA 2001 of FIG. 8A is functionally analogous to PVACA 2001 of FIG. 5A with a couple of additions. In this embodiment, PVACA 2001 is shown as configured with an attached hinge interface connector 191. In another embodiment, hinged interface connector 191 may be removably attached. Hinged interface connector 191 is adapted to be inserted into receiving slot 190 of portable computer system 100 of FIGS. 3A and 3B, thereby providing communicatively and electrically coupling with hinge interface connector 189 of portable computer system 100. The direction of insertion is indicated by arrow 600. In this embodiment, hinge interface connector 191 is configured to provide rotational functionality to PVACA 2001 about the vertical axis, as indicated by arrow 750, and rotational functionality about the horizontal axis, as indicated by arrow 760. In this embodiment, hinge interface connector 191 is shown to have a horizontal pivot, HP 1. HP 1 provides horizontal rotation functionality to PVACA 2001, when coupled with portable computer system 100. Hinge interface connector 191 is shown to also include an upper vertical pivot VP 1, and a lower vertical pivot VP 2. VP 1 and VP 2 provide vertical rotation functionality to PVACA 2001 when coupled with portable computer system 100.

Accordingly, the functionality of PVACA 2001 as described in FIGS. 5A–5D and 6A–6D is therefore retained when PVACA 2001 has hinge interface connector 191 attached thereto. In another embodiment, display device controller 237 of FIG. 7 may be adapted to sense a spinning motion about either of the two axes. In one example, a user desires to jump ten pages to a particular section. By spinning PVACA 2001 about either of the axes ten times, in an appropriate forward direction for the language to which the PVACA 2001 is configured, transparent display controller 237 tracks the number of rotations and displays the appropriate page.

FIG. 8B is an illustrated front-angled view of PVACA (portable viewing and computing apparatus) 2001 having been coupled with portable computer system 100, in one embodiment of the present invention. Portable computer system 100 is shown to have communication interface 180, analogous to communication interface 180 of FIGS. 3A, 3B. Hinge interface connector 191 of PVACA 2001 has been inserted into receiving slot 190 of portable computer system 100, such that hinge interface connector 191 is electrically and communicatively coupled with hinge interface connector 189. This configuration enables direct contact between PVACA 2001 and portable computer system 100.

It should be appreciated that in another embodiment, portable computer system 100 may be configured with receiving slot 190 being disposed upon the top side edge surface, such that insertion of hinge interface connector 191 of PVACA 2001 into receiving slot 190 would be accomplished with a horizontal motion. In another embodiment, portable computer system 100 may be configured with receiving slot 190 being disposed upon the right side edge surface. Because of VP 1 and VP 2 (vertical pivots) as shown in FIGS. 8A and 8B, hinge interface connector 191 of PVACA 2001 can easily be inserted into receiving slot 190 when disposed on the right side of portable computer system 100.

Still referring to FIG. 8B, in this embodiment, because PVACA (portable viewing and computing apparatus) 2001 is coupled with portable computer system 100, PVACA 2001 and portable computer system 100 may both be connected to a network 51 (FIG. 1A) via a docking cradle 60 (FIG. 1A)

utilizing communication interface 180 of FIG. 8B and FIGS. 3A and 3B of portable computer system 100. In this example, communication interface 180 of portable computer system enables synchronization of portable computer system 100 and PVACA (portable computing system) 2001 with other computers.

The general process and results achieved through synchronization, e.g., "hot synch" are described in more detail in the following: U.S. Pat. No. 5,727,202 issued Mar. 10, 1998 by Kucala; U.S. Pat. No. 6,000,000 issued Dec. 7, 1999 by Hawkins et al.; U.S. Pat. No. 5,832,489 issued Nov. 3, 1999 by Kucala; U.S. Pat. No. 5,884,232 issued Mar. 16, 1999 by Hawkins et al.; and U.S. Pat. No. 6,006,274 issued December 21, by Hawkins et al., all of which are hereby incorporated herein by reference.

It should be appreciated that although PVACA (portable viewing and computing apparatus) 2001 is, in this disclosure, shown to be of a size and shape somewhat comparable to the size and shape of a portable computer system. PVACA 2001 can, in another embodiment of the present invention, be of a different shape and can be substantially larger or smaller than the portable computer system described. It should further be appreciated that having a larger sized PVACA 2001 would provide a display more like a page of a book than that displayed on a portable computer system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A portable viewing and computing apparatus comprising:
   a bus;
   a memory unit coupled to said bus for storing data and instructions;
   a processor coupled to said bus for processing said data and instructions;
   a display device coupled to said bus and comprising a viewing panel viewable from a front side and a back side; and
   a display device controller coupled to said bus and for sensing orientation and rotation of said display device, and in response thereto for controlling said display device to display a given portion of information on a given side facing a user, and in response to each of a plurality of rotations in a first direction displaying a corresponding next portion of said information on the given side facing said user.

2. The portable viewing and computing apparatus as recited in claim 1 wherein said display device is transparent.

3. The system as recited in claim 2 wherein said display device of said portable viewing and computing apparatus is transparent.

4. The portable viewing and computing system as recited in claim 1 wherein said display device controller is also for controlling said display device in response to each of a plurality of rotations in a second direction to display a corresponding previous portion of said information on the given side facing said user.

5. The portable viewing and computing system as recited in claim 1 wherein said data, stored in said memory, is of an amount greater than can be displayed on a single side of said display device.

6. The portable viewing and computing system as recited in claim 1 wherein said rotation of said display device is about a vertical axis and about a horizontal axis.

7. The portable viewing and computing system as recited in claim 1 is further comprising a communication device coupled to said bus, said communication device for providing communication enablement to said portable viewing and computing apparatus.

8. The portable viewing and computing apparatus as recited in claim 7 wherein said communication device is a wireless modem.

9. The portable viewing and computing apparatus as recited in claim 7 wherein said wireless modem is Bluetooth enabled.

10. The portable viewing and computing system as recited in claim 1 is further comprising a data storage device adapted to receive SD (secure digital) cards and MMC (multimedia card) and memory sticks.

11. The portable viewing and computing apparatus as recited in claim 1, wherein said display device controller is also for controlling said display device to display said given portion of information on said given side facing said user in a first viewing orientation, and in response to a change from a first orientation to a second orientation of said display controlling said display device to display said given portion of information on said given side facing said user in a second viewing orientation.

12. A system of portable computers comprising:
    a portable computer system comprising a receiving slot configured with a first hinge interface connector disposed therein and adapted to receive a second hinge interface connector; and
    a portable viewing and computing apparatus comprising:
    a bus;
    a memory unit coupled to said bus for storing data and instructions;
    a processor coupled to said bus for processing said data and said instructions;
    a display device coupled to said bus and comprising a viewing panel viewable from a front side and a back side;
    a display device controller coupled to said bus, said display device controller for sensing orientation and rotation of said display device and for displaying a given portion of information on a given side facing a user, and displaying a corresponding next portion of said information on a corresponding side facing said user in response to each of a plurality of rotations from one side to the other of said viewing panel in a first direction; and
    said second hinge interface connector adapted to provide communicative coupling of said portable viewing and computing apparatus with said portable computer system, provided said second hinge interface connector is inserted in said receiving slot of said portable computer system, such that said first hinge interface connector is contacted with said second hinge interface connector.

13. The system as recited in claim 12 wherein said display device controller is also for displaying a corresponding previous portion of said information on a corresponding side facing said user in response to each of a plurality of rotations from one side to the other of said viewing panel in a second direction.

14. The system as recited in claim 12 wherein said data, stored in said memory of said portable viewing and computing apparatus, is of an amount greater than can be displayed on a single side of said display device.

15. The system as recited in claim 12 wherein said rotation of said display device of said portable viewing and computing apparatus is about a vertical axis and about a horizontal axis.

16. The system as recited in claim 12 wherein said portable viewing and computing system further comprises a data storage device adapted to receive SD (secure digital) cards and MMC (multi-media) cards and memory sticks.

17. The system as recited in claim 12 wherein said portable viewing and computing system further comprises a communication device coupled to said bus, said communication device for providing communication enablement to said portable viewing and computing apparatus.

18. The system as recited in claim 17, wherein said communication device is a wireless modem.

19. The system as recited in claim 17 wherein said wireless modem is Bluetooth enabled.

20. A method for displaying data on a display device of a portable viewing and computing apparatus, said method comprising:
   displaying a given portion of said data on a given one of a first and a second side of said portable viewing and computing apparatus;
   sensing each of a plurality of rotations of said display device, from one of said first and second sides to the other of said first and second sides, in a first direction: and
   displaying a corresponding next portion of said data on a corresponding one of said first and a second sides facing a user, in response to each of said plurality of rotations in said first direction.

21. The method for displaying data as recited in claim 20 further comprises:
   sensing each of a plurality of rotations of said display, from one of said first and second sides to the other of said first and second sides, in a second direction; and
   displaying a corresponding previous portion of said data on a corresponding one of said first and said second sides facing said user, in response to each of said plurality of rotations in said second direction.

22. The method for displaying data as recited in claim 20 wherein said first and second directions of rotation are about a vertical axis.

23. The method for displaying data as recited in claim 20 wherein said first and second directions of rotation are about a horizontal axis.

24. The method for displaying data as recited in claim 20 wherein said data, stored in said memory of said portable viewing and computing apparatus, is of an amount greater than can be displayed on a single side of said display device of said portable viewing and computing apparatus.

25. The method for displaying data as recited in claim 20 further comprising:
   sensing each of a plurality of rotations of said display device, from one of said first and second sides to the other of said first and second sides, in a third direction;
   displaying a corresponding next portion of said information on a corresponding one of said first and second sides facing said user, in response to each of said plurality of rotations in said third direction;
   sensing each of a plurality of rotations of said display, from one of said first and second sides to the other of said first and second sides, in a fourth direction; and
   displaying a corresponding previous portion of said data on a corresponding one of said first and said second sides facing said user, in response to each of said plurality of rotations in said fourth direction; and
   wherein an axis of said first and second directions of rotation are substantially perpendicular to an axis of said third and fourth directions of rotation.

26. The method for displaying data as recited in claim 20 further comprising:
   sensing an orientation of said display device;
   displaying said data in a landscape orientation when said display device is in a substantially horizontal orientation; and
   displaying said data in a portrait orientation when said display device is in a substantially vertical orientation.

* * * * *